US012260660B2

(12) United States Patent
Chen et al.

(10) Patent No.: US 12,260,660 B2
(45) Date of Patent: Mar. 25, 2025

(54) FEATURE EXTRACTION SYSTEM, METHOD AND APPARATUS BASED ON NEURAL NETWORK OPTIMIZATION BY GRADIENT FILTERING

(71) Applicant: INSTITUTE OF AUTOMATION, CHINESE ACADEMY OF SCIENCES, Beijing (CN)

(72) Inventors: Yang Chen, Beijing (CN); Guanxiong Zeng, Beijing (CN); Shan Yu, Beijing (CN)

(73) Assignee: INSTITUTE OF AUTOMATION, CHINESE ACADEMY OF SCIENCES, Beijing (CN)

( * ) Notice: Subject to any disclaimer, the term of this patent is extended or adjusted under 35 U.S.C. 154(b) by 883 days.

(21) Appl. No.: 17/411,131

(22) Filed: Aug. 25, 2021

(65) Prior Publication Data
US 2021/0383239 A1     Dec. 9, 2021

Related U.S. Application Data

(63) Continuation-in-part of application No. PCT/CN2019/083355, filed on Apr. 19, 2019.

(30) Foreign Application Priority Data

Feb. 25, 2019    (CN) .......................... 201910138155.4

(51) Int. Cl.
   *G06N 3/084*      (2023.01)
   *G06F 18/21*      (2023.01)
   (Continued)

(52) U.S. Cl.
   CPC .......... *G06V 30/293* (2022.01); *G06F 18/217* (2023.01); *G06N 3/044* (2023.01);
   (Continued)

(58) Field of Classification Search
CPC ............... G06V 30/293; G06V 10/764; G06V 30/1916; G06V 30/287; G06F 18/217;
(Continued)

(56) References Cited

U.S. PATENT DOCUMENTS 8,489,528 B2 *    7/2013    Chowdhary ............. G06N 3/08
                                                                  706/21
2011/0161267 A1    6/2011    Chowdhary et al.

FOREIGN PATENT DOCUMENTS

CN        103559696 A     2/2014
CN        107480777 A    12/2017

OTHER PUBLICATIONS

Guanxiong Zeng, et al., Continual learning of context-dependent processing in neural networks, Nature Machine Intelligence, 2019, pp. 364-372, vol. 1.

* cited by examiner

*Primary Examiner* — Charlotte M Baker
(74) *Attorney, Agent, or Firm* — Bayramoglu Law Offices LLC

(57) ABSTRACT

A feature extraction system, method and apparatus based on neural network optimization by gradient filtering is provided. The feature extraction method includes: acquiring, by an information acquisition device, input information; constructing, by a feature extraction device, different feature extraction networks, performing iterative training on the networks in combination with corresponding training task queues to obtain optimized feature extraction networks for different input information, and calling a corresponding optimized feature extraction network to perform feature extraction according to a class of the input information; performing, by an online updating device, online updating of the networks; and outputting, by a feature output device, a feature of the input information. The new feature extraction (Continued)

system, method and apparatus avoids the problem of catastrophic forgetting of the artificial neural network in continuous tasks, and achieves high accuracy and precision in continuous feature extraction.

17 Claims, 3 Drawing Sheets

(51) Int. Cl.
    *G06N 3/044*         (2023.01)
    *G06V 10/764*       (2022.01)
    *G06V 30/19*         (2022.01)
    *G06V 30/28*         (2022.01)
    *G10L 15/06*         (2013.01)

(52) U.S. Cl.
    CPC ........... *G06N 3/084* (2013.01); *G06V 10/764* (2022.01); *G06V 30/1916* (2022.01); *G10L 15/063* (2013.01); *G06V 30/287* (2022.01)

(58) Field of Classification Search
    CPC .... G06F 18/2413; G06N 3/044; G06N 3/084; G06N 3/045; G10L 15/063; G10L 15/16
    USPC ........................................................ 382/185
    See application file for complete search history.

FIG. 4

FEATURE EXTRACTION SYSTEM, METHOD AND APPARATUS BASED ON NEURAL NETWORK OPTIMIZATION BY GRADIENT FILTERING

CROSS REFERENCE TO THE RELATED APPLICATIONS

This application is the continuation-in-part application of International Application No. PCT/CN2019/083355, filed on Apr. 19, 2019, which is based upon and claims priority to Chinese Patent Application No. 201910138155.4, filed on Feb. 25, 2019, the entire contents of which are incorporated herein by reference.

TECHNICAL FIELD

The present invention relates to the field of machine learning and artificial intelligence, and more particularly, to a feature extraction system and method based on neural network optimization by gradient filtering.

BACKGROUND

With the rapid development of computing capacity of computers and the accumulation of massive data, artificial intelligence has once again received widespread attention from various fields of society and ushered in a new development boom. The core of the current boom is the deep artificial neural network based on connectionism. A deep artificial neural network can extract high-level features from raw data and implement tasks such as pattern detection, recognition and classification based on the high-level features, showing great potential in learning complex mapping rules. In particular, a feature extraction network constructed based on the artificial neural network has been widely used in the field of feature extraction of input information (including picture information, voice information, text information, etc.).

However, such a capability of the artificial neural network is "static", i.e., the mapping is usually fixed once the training is finished. During learning of the feature extraction of a new task or the continuous feature extraction, the feature extraction network constructed based on the artificial neural network generally destroys the mappings established in previous tasks and thus is incapable of continual learning. This is often referred to as "catastrophic forgetting" in the field of machine learning. Many application scenarios require the deep artificial neural network to be able to learn new information and to be self-adaptive. However, "catastrophic forgetting" is undoubtedly a shortcoming.

In general, during use, the feature extraction network constructed based on the artificial neural network often suffers from catastrophic forgetting because it is incapable of continual learning, which greatly affects the accuracy and precision of subsequent feature extraction and makes it difficult to widely apply the feature extraction network to continuous feature extraction of different input information.

SUMMARY

In order to solve the problem in the prior art that catastrophic forgetting occurs when a feature extraction network constructed based on an artificial neural network carries out continual learning or continuous feature extraction, causing a drastic decline in the accuracy and precision of a feature extraction result, the present invention provides a feature extraction system based on neural network optimization by gradient filtering, and the feature extraction system includes:
an information acquisition device, configured to acquire input information and input the input information to a feature extraction device, where the input information includes one or more of the following classes: picture information, voice information and text information;
the feature extraction device, configured to construct feature extraction networks for different input information, iteratively update gradient filter parameters of the networks separately in combination with corresponding training task queues, obtain and store optimized feature extraction networks for different input information, and call a corresponding optimized feature extraction network to perform feature extraction according to a class of the input information acquired by the information acquisition device to obtain a feature of the input information;
an online optimization device, configured to implement online continuous updating of the feature extraction networks during the continuous feature extraction of the continuous input information; and
a feature output device, configured to output the feature of the input information.

In some exemplary embodiments, the feature extraction device includes:
a model constructing module, configured to construct the feature extraction networks for different input information, including: constructing a ResNet neural network as a feature extraction network for the picture information, constructing a Convolutional Neural Network (CNN)/Long Short-Term Memory (LSTM)/Gated Recurrent Unit (GRU) as a feature extraction network for the voice information, and constructing a fastText/TextCNN/Text-Recurrent Neural Network (TextRNN) as a feature extraction network for the text information;
a model optimizing module, configured to: for the feature extraction networks for different input information, iteratively update the gradient filter parameters of the networks separately in combination with the corresponding training task queues to obtain the optimized feature extraction networks for different input information;
a model storing module, configured to store the optimized feature extraction networks for different input information; and
a model calling module, configured to call a corresponding optimized feature extraction network according to the class of input information acquired by an information acquisition end, and perform feature extraction to obtain a feature of the input information.

In some exemplary embodiments, the model optimizing module includes:
a model initializing submodule, configured to initialize a feature extraction network $M(1)$ and acquire an initial filter parameter $\{P_l(1)\}$ for each layer of $M(1)$, where l is a layer serial number of $M(1)$;
a first data processing submodule, configured to process input data $A(j)$ of the $j^{th}$ training task $R(j)$ in the training task queue by using $M(j)$, to obtain an output data set $\{C_l(j)\}$ of each layer of $M(j)$;
a back propagation (BP) gradient flow calculating submodule, configured to calculate, based on the output data set $\{C_l(j)\}$ of each layer of $M(j)$, a gradient flow $\Delta W_l(i, j)$ of neuron weights $W_l(i-1, j)$ of each layer of M(j) on the $i^{th}$ batch of data in the input data A(j) of the $j^{th}$ training task R(j) by using an error back propagation algorithm;

a filter, configured to filter the gradient flow $\Delta W_l(i, j)$ by using a filter parameter $\{P_l(j)\}$ for each layer of M(j), to obtain a filtered gradient flow $\Delta \hat{W}_l(i, j) = P_l(j) \Delta W_l(i, j)$;

a weight updating submodule, configured to update the neuron weights $W_l(i-1, j)$ of each layer of the feature extraction network M(j) based on the filtered gradient flow $\Delta \hat{W}_l(i, j)$ and a preset learning rate function $\lambda(i, j)$, to obtain updated weights $W_l(i, j)$;

a second data processing submodule, configured to process the input data A(j) of the $j^{th}$ training task R(j) in the training task queue by using M(j+1) with the updated weights $W_l(i, j)$, to obtain an updated output data set $\{C'_l(j)\}$ of each layer of M(j+1);

a filter parameter updating submodule, configured to update the filter parameter based on the updated output data set $\{C'_l(j)\}$, to obtain an updated filter parameter $\{P_l(j+1)\}$; and a model training loop control submodule, configured to set j=j+1, and iteratively update filter parameters and weights of the feature extraction network until training tasks in the training task queue are completed, to obtain an optimized feature extraction network corresponding to current input information.

An artificial neural network with weights of all layers having been updated through data of one training task is used as an artificial neural network of a next task, to update the weights of the network cyclically, until all training tasks in the training task queue are completed.

In some exemplary embodiments, the model initializing submodule initializes the feature extraction network M(1) and acquire the initial filter parameter $\{P_l(1)\}$ for each layer of M(1) by using the following method:

$$P_l(1) = \beta I_l$$

where $I_l$ is an identity matrix, and $\beta$ is a preset hyper-parameter.

In some exemplary embodiments, the weight updating submodule updates the neuron weights $W_l(i-1, j)$ of each layer of the feature extraction network M(j) based on the filtered gradient flow $\Delta \hat{W}_l(i, j)$ and the preset learning rate function $\lambda(i, j)$ by using the following method:

$$W_l(i,j) = W_l(i-1,j) + \lambda(i,j) \Delta \hat{W}_l(i,j)$$

where $W_l(i, j)$ is an updated weight matrix, $W_l(i-1, j)$ is a weight matrix before update, $\Delta \hat{W}_l(i, j)$ is an update increment, $\lambda(i, j)$ is the learning rate function, and $P_l(j-1)$ is orthogonal to a training task space of the first to the $(j-1)^{th}$ training task.

In some exemplary embodiments, the filter parameter updating submodule updates the filter parameter based on the updated output data set $\{C'_l(j)\}$ to obtain the updated filter parameter $\{P_l(j+1)\}$ by using the following method:

$$P_l(i,j) = P_l(i-1,j) - k_l \bar{x}_{l-1}(i,j)^T P_l(i-1,j)$$

$$k_l(i,j) = P_l(i-1,j) \bar{x}_{l-1}(i,j) / [\alpha_l(i) + \bar{x}_{l-1}(i,j)^T P_l(i-1,j) \bar{x}_{l-1}(i,j)]$$

$$P_l(0,j) = P_l(j)$$

$$P_l(j+1) = P_l(n_j, j)$$

where j represents that j tasks are already completed; $n_j$ represents a batch number of feed-forward training data in the $j^{th}$ training task; $\bar{x}_{l-1}(i, j)$ represents an output result from neurons in the (l-1) layer for the $i^{th}$ batch of data in the $j^{th}$ training task; $P_l(j)$ is a filter parameter corresponding to the $l^{th}$ layer of $M_l(j)$ in the $j^{th}$ training task; $\alpha_l(i)$ is a preset filter parameter updating speed rule, and T represents matrix transposition.

In some exemplary embodiments, the preset filter parameter updating speed rule $\alpha_l(i)$ is calculated by using the following method:

$$\alpha_l(i) = \alpha_l(0) \gamma^{\sigma i / n_j}$$

where $\gamma$, $\alpha_l(0)$, and $\sigma$ are preset hyper-parameters.

According to another aspect of the present invention, a feature extraction method based on neural network optimization by gradient filtering is provided, where on the basis of the feature extraction system based on neural network optimization by gradient filtering described above, the feature extraction method includes:

step S10: constructing different feature extraction networks configured to extract input information features for different input information, including: constructing a ResNet neural network as a feature extraction network for the picture information, constructing a CNN/LSTM/GRU as a feature extraction network for the voice information, and constructing a fastText/TextCNN/TextRNN neural network as a feature extraction network for the text information;

step S20: for any one of the feature extraction networks for different input information, initializing the feature extraction network M(1) and acquiring an initial filter parameter $\{P_l(1)\}$ for each layer of M(1), where l is a layer serial number of M(1);

step S30: processing input data A(j) of the $j^{th}$ training task R(j) in a training task queue by using M(j), to obtain an output data set $\{C_l(j)\}$ of each layer of M(j);

step S40: calculating, based on the output data set $\{C_l(j)\}$ of each layer of M(j), a gradient flow $\Delta W_l(i, j)$ of neuron weights $W_l(i-1, j)$ of each layer of M(j) on the $i^{th}$ batch of data in the input data A(j) of the $j^{th}$ training task R(j) by using an error back propagation algorithm;

step S50: filtering the gradient flow $\Delta W_l(i, j)$ by using a filter parameter $\{P_l(j)\}$ for each layer of M(j), to obtain a filtered gradient flow $\Delta \hat{W}_l(i, j) = P_l(j) \Delta W_l(i, j)$;

step S60: updating the neuron weights $W_l(i-1, j)$ of each layer of the feature extraction network M(j) based on the filtered gradient flow $\Delta \hat{W}_l(i, j)$ and a preset learning rate function $\lambda(i, j)$, to obtain updated weights $W_l(i, j)$;

step S70: processing the input data A(j) of the $j^{th}$ training task R(j) in the training task queue by using M(j+1) with the updated weights $W_l(i, j)$, to obtain an updated output data set $\{C'_l(j)\}$ of each layer of M(j+1);

step S80: updating the filter parameter based on the updated output data set $\{C'_l(j)\}$, to obtain an updated filter parameter $\{P_l(j+1)\}$;

step S90: setting j=j+1, and performing step S30 to step S80 repeatedly until training tasks in the training task queue are completed, to obtain an optimized feature extraction network corresponding to current input information;

step Sa0: optimizing the feature extraction networks for different input information by a method including step S20 to step S90, to obtain the optimized feature extraction networks for different input information; and step Sb0: calling a corresponding optimized feature extraction network according to a class of input information, and performing feature extraction to obtain a feature of the input information.

According to a third aspect of the present invention, a continuous recognition method for handwritten Chinese characters based on artificial neural network optimization is provided, where the continuous recognition method for handwritten Chinese characters includes:

step B10, using a multilayer perceptron as an artificial neural network $M_j$ for continual learning, and optimizing the artificial neural network $M_j$ by using an artificial neural network optimization method corresponding to step S20 to step S90 in the feature extraction method based on neural network optimization by gradient filtering described above; and step B20, extracting features of a handwritten Chinese character picture through a residual network, and continuously recognizing handwritten Chinese characters based on the features of the handwritten Chinese character picture through an optimized artificial neural network to obtain a continuous recognition result for the handwritten Chinese characters.

According to a fourth aspect of the present invention, a processing apparatus is provided, including a processor and a storage apparatus, where the processor is configured to execute each program; and the storage apparatus is configured to store a plurality of programs; the programs are loaded and executed by the processor to implement the foregoing feature extraction method based on neural network optimization by gradient filtering, or continuous recognition method for handwritten Chinese characters based on artificial neural network optimization.

Beneficial Effects of the Present Invention (1) According to the feature extraction system based on neural network optimization by gradient filtering in the present invention, in a feature extraction network constructed based on an artificial neural network, weights of the feature extraction network are modified by using gradient filtering in combination with training task data, thus implementing optimization of the feature extraction network (orthogonal weights modification, OWM for short). Fine control and adjustment can be performed on the weights of the artificial neural network. Particularly, during selection of a suitable task space, the present invention can effectively avoid the problem of "catastrophic forgetting" of the artificial neural network during continual learning, thereby effectively preventing a drastic decline in the accuracy and precision of feature extraction caused by the crash of the artificial neural network in a continuous feature extraction process.

(2) The present invention avoids operations such as sample saving or key sample extraction in a training process, thus saving arithmetic power, memory and time costs.

(3) In the present invention, fine tuning is directly performed on the weights of the artificial neural network, which is more flexible and purposeful.

BRIEF DESCRIPTION OF THE DRAWINGS

Other features, objectives and advantages of the present invention will become more apparent upon reading the detailed description of the non-restrictive embodiments with reference to the following accompanying drawings.

FIG. 4 is an exemplary diagram of a handwritten Chinese character database in an embodiment of a continuous recognition method for handwritten Chinese characters based on artificial neural network optimization according to the present invention.

DETAILED DESCRIPTION OF THE EMBODIMENTS

Figure 1:
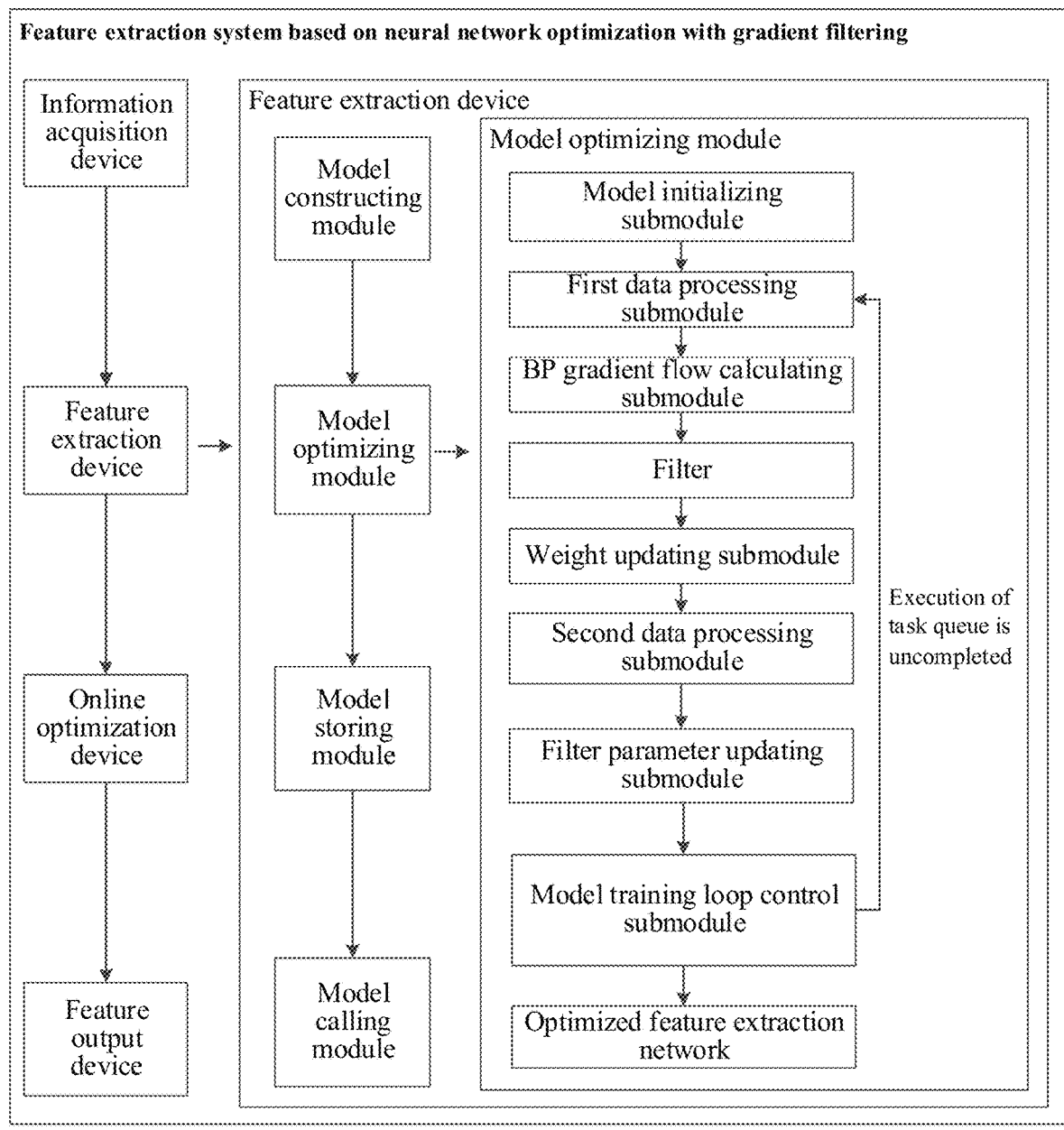
FIG. 1 is a schematic composition diagram of a feature extraction system based on neural network optimization by gradient filtering according to the present invention.

The present invention will be further described in detail below in conjunction with the accompanying drawings and embodiments. It may be understood that the specific embodiments described herein are merely intended to explain the related disclosure, rather than to limit the present invention. It should also be noted that, for convenience of description, only the parts related to the present invention are shown in the accompany drawings.

It should be noted that the embodiments in the present invention and features in the embodiments may be combined with each other if no conflict occurs. The present invention will be described in detail below with reference to the accompanying drawings and the embodiments.

The present invention provides an artificial neural network optimization method based on gradient filtering, which finely controls, by using filter parameters in combination with training data of training tasks, an evolution direction of a feature extraction network constructed based on an artificial neural network, thus solving the problem of "catastrophic forgetting" in past training. Depending on different task requirements or purposes, the filter parameters may be defined on different input vector spaces. In addition, the filter parameters may further act locally on the network, or even on specific weights of specific neurons. These advantages bring great flexibility in specific implementation of the present invention. In addition, the method is simple in computing and achieves a significant effect, thus saving arithmetic power, memory and time costs, and greatly improving the accuracy and precision of subsequent feature extraction, as well as the stability of the feature extraction network.

The present invention provides a feature extraction system based on neural network optimization by gradient filtering, where the feature extraction system includes:

an information acquisition device, configured to acquire input information and input the input information to a feature extraction device, where the input information includes one or more of the following classes: picture information, voice information and text information;

the feature extraction device, configured to construct feature extraction networks for different input information, iteratively update gradient filter parameters of the networks separately in combination with corresponding training task queues, obtain and store optimized feature extraction networks for different input information, and call a corresponding optimized feature extraction network to perform feature extraction according to a class of the input information acquired by the information acquisition device to obtain a feature of the input information;

an online optimization device, configured to implement online continuous updating of the feature extraction networks during the continuous feature extraction of the continuous input information; and a feature output device, configured to output the feature of the input information.

To describe the artificial neural network optimization method based on gradient filtering according to the present invention more clearly, modules in the embodiments of the present invention are described in detail below with reference to FIG. 1.

The feature extraction system based on neural network optimization by gradient filtering according to an embodiment of the present invention includes an information acquisition device, a feature extraction device, and a feature output device, which are described in detail as follows:

The information acquisition device is configured to acquire input information and input the input information to the feature extraction device, where the input information includes one or more of the following classes: picture information, voice information and text information.

There are various modes of information, and various acquisition devices are used for different information. For example, picture or video information can be acquired by a camera, voice information can be acquired by an audio acquisition device, and text information can be acquired by a keyboard, a mouse or other devices, which are not detailed in the present invention.

The feature extraction device is configured to construct feature extraction networks for different input information, iteratively update gradient filter parameters of the networks separately in combination with corresponding training task queues, obtain and store optimized feature extraction networks for different input information, and call a corresponding optimized feature extraction network to perform feature extraction according to a class of the input information acquired by the information acquisition device to obtain a feature of the input information.

The feature extraction device includes a model constructing module, a model optimizing module, a model storing module, and a model calling module.

The model constructing module is configured to construct the feature extraction networks for different input information, including: constructing a ResNet neural network as a feature extraction network for the picture information, constructing a CNN/LSTM/GRU as a feature extraction network for the voice information, and constructing a fastText/TextCNN/TextRNN neural network as a feature extraction network for the text information.

Different feature extraction networks constructed to extract features of different input information include one or more of the following: a picture information processing network, a voice information processing network, and a text information processing network, and may further include information processing networks for other common information types, which are not enumerated herein. The information processing network in the present invention may be constructed based on a neural network. For example, for the picture input information, ResNet or other neural networks may be selected; for the voice input information, CNN, LSTM, GRU or other neural networks may be selected; for the text input information, fastText, TextCNN, TextRNN or other neural networks may be selected. In real-world environments, information is generally multimodal and can be processed simultaneously using a combination of multiple information processing networks, which can enrich the expression of information and also greatly reduce the dimensionality of original information, making downstream information easier to process.

The model optimizing module is configured to: for the feature extraction networks for different input information, iteratively update the gradient filter parameters of the networks separately in combination with the corresponding training task queues to obtain the optimized feature extraction networks for different input information.

The model storing module is configured to store the optimized feature extraction networks for different input information.

The model calling module is configured to call a corresponding optimized feature extraction network according to a class of input information acquired by an information acquisition end, and perform feature extraction to obtain a feature of the input information.

The model optimizing module further includes a model initializing submodule, a first data processing submodule, a BP gradient flow calculating submodule, a filter, a weight updating submodule, a second data processing submodule, a filter parameter updating submodule, and a model training loop control submodule.

The model initializing submodule is configured to initialize a feature extraction network M(1) and acquire an initial filter parameter $\{P_l(1)\}$ for each layer of M(1), where l is a layer serial number of M(1).

The feature extraction network M(1) is updated and the initial filter parameter $\{P_l(1)\}$ for each layer of M(1) is acquired by using a method shown in formula (1):

$$P_l(1)=\beta I_l$$

where $I_l$ is an identity matrix, and $\beta$ is a preset hyper-parameter.

The function of the filter is mathematically equivalent to a gradient filter parameter $P_l$, which is defined by formula (2):

$$P_l=I_l-A_l(A_l^T A_l+\alpha I_l)^{-1}A_l^T \qquad (2)$$

where $P_l$ is the filter parameter of the feature extraction network, i.e., a projection matrix corresponding to a filter; $A_l$ is a matrix obtained by stacking input vectors of the $l^{th}$ layer in all previous tasks, $A_l=[x_l(1), \ldots, x_l(i), \ldots, x_l(n)]$, and $x_l(i)$ is an input vector of the $l^{th}$ layer; $A_l^T$ is a transposition of the matrix $A_l$; $I_l$ is an identity matrix; and $\alpha$ is a preset hyper-parameter.

The first data processing submodule is configured to process input data A(j) of the $j^{th}$ training task R(j) in the training task queue by using M(j), to obtain an output data set $\{C_l(j)\}$ of each layer of M(j).

The BP gradient flow calculating submodule is configured to calculate, based on the output data set $\{C_l(j)\}$ of each layer of M(j), a gradient flow $\Delta W_l(i, j)$ of neuron weights $W_l(i-1, j)$ of each layer of M(j) on the $i^{th}$ batch of data in the input data A(j) of the $j^{th}$ training task R(j) by using an error back propagation algorithm.

The filter is configured to filter the gradient flow $\Delta W_l(i, j)$ by using a filter parameter $\{P_lU)\}$ for each layer of M(j), to obtain a filtered gradient flow $\Delta \hat{W}_l(i, j)=P_l(j)\Delta W_l(i, j)$.

The weight updating submodule is configured to update the neuron weights $W_l(i-1, j)$ of each layer of the feature extraction network M(j) based on the filtered gradient flow $\Delta \hat{W}_l(i, j)$ and a preset learning rate function $\lambda(i, j)$, to obtain updated weights $W_l(i, j)$.

In the embodiments of the present invention, an update increment $\Delta W_l(i, j)$ of the neuron weights $W_l(i-1, j)$, l=1, 2 of the $l^{th}$ layer of the artificial neural network $M_l(j)$ on the current batch of data is calculated by using an error back propagation (BP) algorithm. To avoid catastrophic forgetting, only the part $P_l(i-1, j)\Delta W_l(i, j)$ orthogonal to input data in the previous tasks is reserved in $\Delta W_l(i, j)$.

The neuron weights $W_l(i-1, j)$ of each layer of the feature extraction network $M(j)$ are updated based on the filtered gradient flow $\Delta \hat{W}(i, j)$ and the preset learning rate function $\lambda(i, j)$ by using a method as shown in formula (3):

$$W_l(i,j)=W_l(i-1,j)+\lambda(i,j)\Delta \hat{W}_l(i,j) \quad (3)$$

where $W_l(i, j)$ is an updated weight matrix, $W_l(i-1, j)$ is a weight matrix before update, $\Delta \hat{W}_l(i, j)$ is an update increment, $\lambda(i, j)$ is the learning rate function, and $P_l(j-1)$ is orthogonal to a training task space of the first to the $(j-1)^{th}$ training task.

The second data processing submodule is configured to process the input data $A(j)$ of the $j^{th}$ training task $R(j)$ in the training task queue by using $M(j+1)$ with the updated weights $W_l(i, j)$, to obtain an updated output data set $\{C'_l(j)\}$ of each layer of $M(j+1)$.

The filter parameter updating submodule is configured to update the filter parameter based on the updated output data set $\{C'_l(j)\}$, to obtain an updated filter parameter $\{P_l(j+1)\}$.

In the learning process in the embodiments of the present invention, learning rates of all the layers are constantly set to 2.0. Because $P_l(j)$ is orthogonal to the training task space of the first to the $j^{th}$ training task, a result of interaction between the weight update in the $j^{th}$ training task and the previous input should be 0, and the rest can be deduced by analogy, thus ensuring that the new training task is completed without affecting the performance of all the previous training tasks.

The filter parameter updating submodule updates the filter parameter based on the updated output data set $\{C'_l(j)\}$ to obtain the updated filter parameter $\{P_l(j+1)\}$ by using a method as shown in formula (4) to formula (7):

$$P_l(i,j)=P_l(i-1,j)-k_l\bar{x}_{l-1}(i,j)^T P_l(i-1,j) \quad (4)$$

$$k_l(i,j)=P_l(i-1,j)\bar{x}_{l-1}(i,j)/[\alpha_l(i)+\bar{x}_{l-1}(i,j)^T P_l(i-1,j)\bar{x}_{l-1}(i,j)] \quad (5)$$

$$P_l(0,j)=P_l(j) \quad (6)$$

$$P_l(j+1)=P_l(n_j,j) \quad (7)$$

where $j$ represents that $j$ tasks are already completed; $n_j$ represents a batch number of feed-forward training data in the $j^{th}$ training task; $\bar{x}_{l-1}(i, j)$ represents an output result from neurons in the $(l-1)^{th}$ layer for the $i^{th}$ batch of data in the $j^{th}$ training task; $P_l(j)$ is a filter parameter corresponding to the $l^{th}$ layer of $M_l(j)$ in the $j^{th}$ training task; $\alpha_l(i)$ is a preset filter parameter updating speed rule, and T represents matrix transposition.

The preset filter parameter updating speed rule $\alpha_l(i)$ is calculated by using a method as shown in formula (8):

$$\alpha_l(i)=\alpha_l(0)\gamma^{ai/nj} \quad (8)$$

where $\gamma$, $\alpha_l(0)$, and $a$ are preset hyper-parameters.

Figure 2:
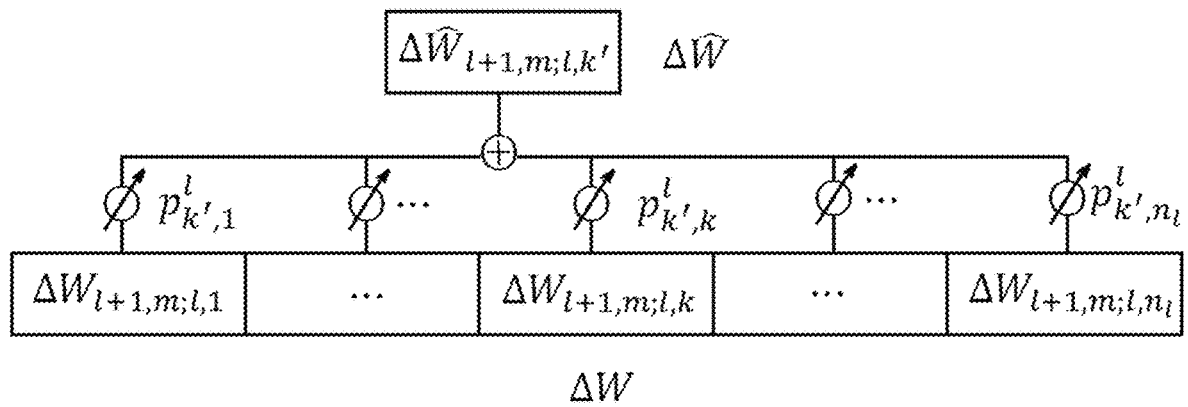
FIG. 2 is a schematic diagram of filter parameter updating in a feature extraction system based on neural network optimization by gradient filtering according to the present invention.

FIG. 2 is a schematic diagram of filter parameter updating in a feature extraction system based on neural network optimization by gradient filtering according to the present invention, where $\Delta W_{l+1,m;\ l,k}$ ($k=1, \ldots, n_l$; $m=1, \ldots, n_{l+1}$) is a gradient flow of weights of the $k^{th}$ neuron in the $l^{th}$ layer to the $m^{th}$ neuron in the $l+1^{th}$ layer of the neural network obtained based on the BP algorithm, and $\Delta \hat{W}_{l+1,m;\ k,l,k}$ is a corresponding filtered gradient flow. An information flow from the unit $\Delta W_{l+1,m;\ k,l,k}$ to the unit $\Delta \hat{W}_{l+1,m;\ k,l,k'}$ first passes through a switch gate $P_{k',k}^{l}$ that can be continuously regulated, which is equivalent to the element at the $k'^{th}$ row and $k^{th}$ column of the matrix $P_l$ during the calculation process based on formula (4) to formula (7). After being modulated by the corresponding switch gate, $\Delta W_{l+1,m;\ k,l,k}$ ($k=1, \ldots, n_l$; $m=1, \ldots, n_{l+1}$) is inputted to an adder, and outputted to $\Delta \hat{W}_{l+1,m;\ k,l,k'}$ after summation.

The model training loop control submodule is configured to set $j=j+1$, and iteratively update filter parameters and weights of the feature extraction network until training tasks in the training task queue are completed, to obtain an optimized feature extraction network corresponding to current input information.

The online optimization device is configured to implement online continuous updating of the feature extraction networks during the continuous feature extraction of the continuous input information.

Currently, during training of artificial neural networks, data samples from all tasks are mixed and "fed" to the system at the same time. After training, the learning capability of the system is also turned off, not to mention the flexibility to respond to different contexts in real-world applications. Human beings usually learn one item before proceeding to the next, and it is emphasized to avoid rigid application in practice. Obviously, such a learning and interaction approach is a great difficulty for artificial neural networks. Can artificial intelligence ignore the capability of continual learning? The answer is no. In practice, problems to be dealt with are usually unpredictable and can be complicated by different factors when they arise. Therefore, it is necessary to learn continuously and respond flexibly to new situations. Continual learning is one of the core capabilities of the brain and one of the keys to achieving general artificial intelligence.

Because it may greatly improve the adaptability of artificial intelligence systems to complex environments, continual learning may also fundamentally change the way we interact with intelligent devices. Currently, the level of human intelligence still far exceeds that of artificial intelligence. Therefore, during interaction, humans need to accommodate and actively adapt to machine intelligence, and make an effort to learn various established rules of the system. However, if the machine intelligence has the ability to learn independently, the one-way adaptation will likely become a two-way interaction, which greatly improves the efficiency of human-machine collaboration. In addition, the existing software system is one-sided, and its optimization method is also extremely similar to the training method of neural networks, that is, the application process and optimization process are separated from each other. It may be too costly to design a dedicated optimized intelligent system for each customer or each application scenario. However, if the artificial intelligence system has the capabilities of independent learning, automatic adaptation and active service, it is possible to implement an adaptive intelligent system. Such a need does exist in practice. With the development of edge computing, most of the future computing may be done at the edge instead of being all uploaded to the cloud. Edge computing will have to take into account the specificity of local data and the specificity of the corresponding needs. At the same time, with the popularization and deepening of the Internet of Things, intelligent systems need to face more complex and diverse scenarios and needs, and it will become difficult to solve all problems with only one system or one model. Therefore, when artificial intelligence really moves toward human intelligence, the existing operating systems and software environments may need to be fundamentally changed, and even the hardware systems will need to be adjusted accordingly. This is a huge challenge but also an unprecedented opportunity. Continual learning may play an important role in this process.

The feature output device is configured to output the feature of the input information.

A feature extraction method based on neural network optimization by gradient filtering according to the second embodiment of the present invention is provided on the basis of the feature extraction system based on neural network optimization by gradient filtering described above. The feature extraction method includes the following steps:

Step S10: Construct different feature extraction networks configured to extract input information features for different input information, including: constructing a ResNet neural network as a feature extraction network for the picture information, constructing a CNN/LSTM/GRU as a feature extraction network for the voice information, and constructing a fastText/TextCNN/TextRNN neural network as a feature extraction network for the text information.

Step S20: For any one of the feature extraction networks for different input information, initialize the feature extraction network M(1) and acquire an initial filter parameter $\{P_f(1)\}$ for each layer of M(1), where l is a layer serial number of M(1).

Step S30: Process input data A(j) of the $j^{th}$ training task R U) in a training task queue by using M(j), to obtain an output data set $\{C_f(j)\}$ of each layer of M(j).

Step S40: Calculate, based on the output data set $\{C_f(j)\}$ of each layer of M(j), a gradient flow $\Delta W_f(i, j)$ of neuron weights $W_f(i-1, j)$ of each layer of M(j) on the $i^{th}$ batch of data in the input data A(j) of the $j^{th}$ training task R(j) by using an error back propagation algorithm.

Step S50: Filter the gradient flow $\Delta W_f(i, j)$ by using a filter parameter $\{P_f(j)\}$ for each layer of M(j), to obtain a filtered gradient flow $\Delta \hat{W}_f(i, j) = P_f(j) \Delta W_f(i, j)$.

Step S60: Update the neuron weights $W_f(i-1, j)$ of each layer of the feature extraction network M(j) based on the filtered gradient flow $\Delta \hat{W}_f(i, j)$ and a preset learning rate function $\lambda(i, j)$, to obtain updated weights $W_f(i, j)$.

Step S70: Process the input data A(j) of the $j^{th}$ training task R(j) in the training task queue by using M(j+1) with the updated weights $W_f(i, j)$, to obtain an updated output data set $\{C'_f(j)\}$ of each layer of M(j+1).

Step S80: Update the filter parameter based on the updated output data set $\{C'_f(j)\}$, to obtain an updated filter parameter $\{P_f(j+1)\}$.

Step S90: Set j=j+1, and perform step S30 to step S80 repeatedly until training tasks in the training task queue are completed, to obtain an optimized feature extraction network corresponding to current input information.

Step Sa0: Optimize the feature extraction networks for different input information by a method including step S20 to step S90, to obtain the optimized feature extraction networks for different input information.

Step Sb0: Call a corresponding optimized feature extraction network according to a class of input information, and perform feature extraction to obtain a feature of the input information.

An artificial neural network with weights of all layers having been updated through data of one training task is used as an artificial neural network of a next training task, to update the weight matrix of the network cyclically, until all training tasks in the training task queue are completed. The weight matrix of the network space of each new learning task is updated during the execution of the previous historical training task and updated again during the execution of the new task, and so on, ensuring that the latest network space in the continuous learning tasks carries the information of the historical task network space and avoiding the problem of catastrophic forgetting in the continual learning process.

In the embodiments of the present invention, during training of the j(j=1, . . . , 3755)$^{th}$ task, after the $i^{th}$ batch of data is inputted to the neural network and the weights are updated according to step S30, the gradient filter parameter $P_f(j)$ is updated.

Figure 3:
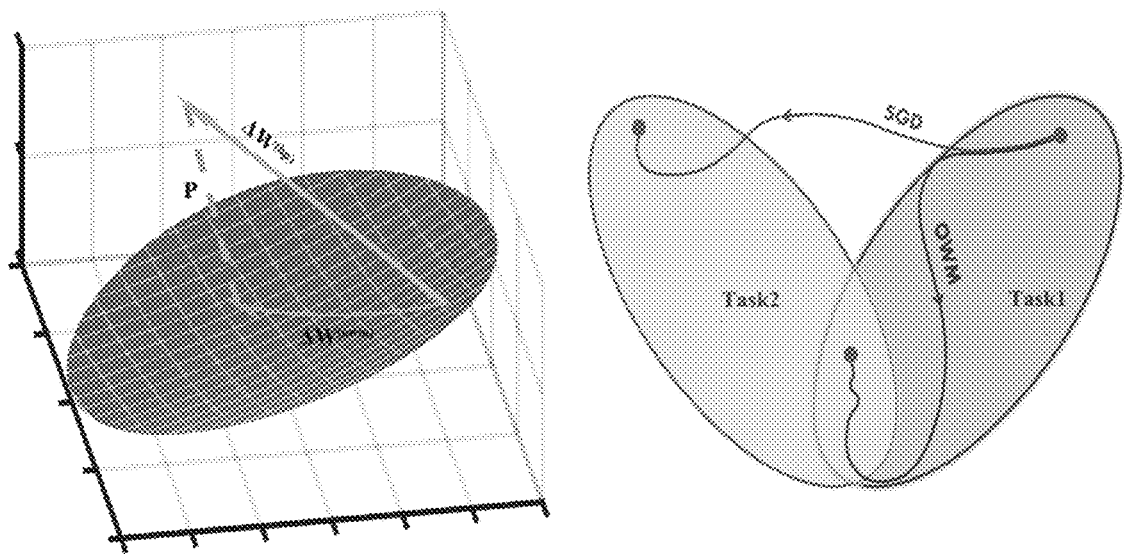
FIG. 3 is a schematic diagram of a feature extraction method based on neural network optimization by gradient filtering according to the present invention.

FIG. 3 is a schematic diagram of a feature extraction method based on neural network optimization by gradient filtering according to the present invention, where P represents gradient filtering; $\Delta W^{(bp)}$ represents a weight matrix increment directly calculated through an error back propagation algorithm and stochastic gradient descent; $\Delta W^{(own)}$ represents a weight matrix increment obtained through the algorithm according to the present invention; Task1 represents task 1; Task2 represents task 2; and SGD represents a stochastic gradient descent algorithm.

A third embodiment of the present invention provides a continuous recognition method for handwritten Chinese characters based on artificial neural network optimization, where the continuous recognition method for handwritten Chinese characters includes the following steps:

Step B10: Use a multilayer perceptron as an artificial neural network $M_j$ for continual learning, and optimize the artificial neural network $M_j$ by using an artificial neural network optimization method corresponding to step S20 to step S90 in the feature extraction method based on neural network optimization by gradient filtering described above.

Step B20: Extract features of a handwritten Chinese character picture through a residual network, and continuously recognize handwritten Chinese characters based on the features of the handwritten Chinese character picture through an optimized artificial neural network to obtain a continuous recognition result for the handwritten Chinese characters.

Figure 4:
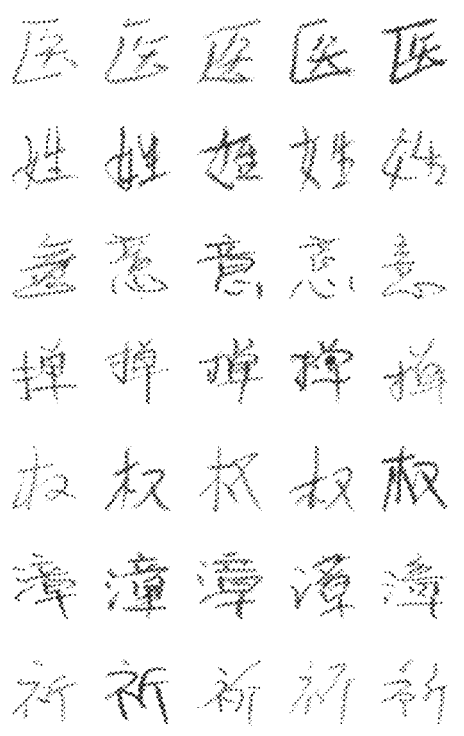

Continuous recognition tasks for handwritten Chinese characters in the present invention use an open database of Chinese handwriting styles developed by the Institute of Automation, Chinese Academy of Sciences: CASIA-HWDB1.1. The database contains a total of 3755 Chinese characters, which basically covers Class I fonts of Chinese characters. FIG. 4 is an exemplary diagram of a handwritten Chinese character database in an embodiment of a continuous recognition method for handwritten Chinese characters based on artificial neural network optimization according to the present invention. Each character contains 300 handwritten images. Each Chinese character is treated as a separate learning task, and after the training of each task is completed, the Chinese character is not retrained and its pictures do not appear as negative samples in the training tasks of other Chinese characters. That is, the neural network needs to be trained with 3755 tasks continuously to learn each Chinese character.

Features are extracted from the handwritten Chinese character pictures by using residual networks (ResNet18). A multilayer perceptron is used as an artificial neural network for continual learning $M_j$. Update of the artificial neural network and the continuous recognition for handwritten Chinese characters are implemented using the foregoing method.

It should be noted that, for the feature extraction system and method based on neural network optimization by gradient filtering provided in the foregoing embodiments, the division of the foregoing function modules is merely used as an example. In practical applications, the foregoing functions may be allocated to and completed by different function modules as required. That is, the modules or steps in the embodiments of the present invention are further divided or combined. For example, the modules in the foregoing embodiments may be combined into one module, or further divided into multiple submodules to complete all or some of the functions described above. The names of the modules and steps in the embodiments of the present invention are only for the purpose of distinguishing one module or step from another, and are not considered as improper limitations on the present invention.

A fourth embodiment of the present invention provides a storage apparatus, storing a plurality of programs. The programs are loaded and executed by a processor to implement the foregoing feature extraction method based on neural network optimization by gradient filtering, or continuous recognition method for handwritten Chinese characters based on artificial neural network optimization.

A fifth embodiment of the present invention provides a processing apparatus, including a processor and a storage apparatus, where the processor is configured to execute each program; and the storage apparatus is configured to store a plurality of programs; the programs are loaded and executed by the processor to implement the foregoing feature extraction method based on neural network optimization by gradient filtering, or continuous recognition method for handwritten Chinese characters based on artificial neural network optimization.

A person skilled in the art can clearly understand that, for convenience and brevity of description, reference can be made to corresponding processes in the foregoing method embodiments for specific working processes of the above-described storage apparatus and processing apparatus. Details are not described herein again.

A person skilled in the art should be able to realize that the modules and method steps of each example described in conjunction with the embodiments disclosed herein can be implemented by electronic hardware, computer software, or a combination thereof. Programs corresponding to the software modules and method steps can be placed in a random access memory (RAM), an internal memory, a read-only memory (ROM), an electrically programmable ROM, an electrically erasable programmable ROM, a register, a hard disk, a removable disk, a CD-ROM, or any other form of storage media known in the art. In order to clearly illustrate the interchangeability of the electronic hardware and software, the composition and steps of each example have been described generally by functions in the above description. Whether the functions are performed by electronic hardware or software depends on particular applications and design constraint conditions of the technical solutions. A person skilled in the art may use different methods to implement the described functions for each specific application, but such implementation should not be considered to be beyond the scope of the present invention.

In addition, terms "include", "comprise" or any other variations thereof are intended to cover non-exclusive inclusions, so that a process, a method, an article, or a device/apparatus including a series of elements not only includes those elements, but also includes other elements that are not explicitly listed, or also includes inherent elements of the process, the method, the article or the device/apparatus.

The technical solutions of the present invention are described with reference to the preferred implementations and accompanying drawings. Those skilled in the art should easily understand that the protection scope of the present invention is apparently not limited to these specific implementations. Those skilled in the art can make equivalent changes or substitutions to the relevant technical features without departing from the principles of the present invention, and the technical solutions after these changes or substitutions should fall within the protection scope of the present invention.

What is claimed is:

1. A feature extraction system based on neural network optimization by gradient filtering, comprising:
    an information acquisition device, configured to acquire and input continuous input information to a feature extraction device, wherein the continuous input information comprises one or more selected from the group consisting of picture information, voice information and text information;
    the feature extraction device, configured to construct feature extraction networks for different input information, iteratively update gradient filter parameters of the feature extraction networks separately in combination with corresponding training task queues, obtain and store optimized feature extraction networks for different input information, and call a corresponding optimized feature extraction network to perform continuous feature extraction according to a class of the continuous input information acquired by the information acquisition device to obtain a continuous feature corresponding to the continuous input information;
    an online optimization device, configured to implement online continuous updating of the feature extraction networks during the continuous feature extraction of the continuous input information; and
    a feature output device, configured to output the continuous feature corresponding to the continuous input information.

2. The feature extraction system according to claim 1, wherein the feature extraction device comprises:
    a model constructing module, configured to construct the feature extraction networks for different input information, comprising: constructing a ResNet neural network as a feature extraction network for the picture information, constructing a Convolutional Neural Network (CNN)/Long Short-Term Memory (LSTM)/Gated Recurrent Unit (GRU) as a feature extraction network for the voice information, and constructing a fastText/TextCNN/Text-Recurrent Neural Network (TextRNN) as a feature extraction network for the text information;
    a model optimizing module, configured to: for the feature extraction networks for different input information, iteratively update the gradient filter parameters of the feature extraction networks separately in combination with the corresponding training task queues to obtain the optimized feature extraction networks for different input information;
    a model storing module, configured to store the optimized feature extraction networks for different input information; and
    a model calling module, configured to call a corresponding optimized feature extraction network according to a class of input information acquired by an information acquisition end, and perform feature extraction to obtain a feature of the input information.

3. The feature extraction system according to claim 2, wherein the model optimizing module comprises:
    a model initializing submodule, configured to initialize a feature extraction network M(1) and acquire an initial filter parameter $\{P_f(1)\}$ for each layer of the feature extraction network M(1), wherein *l* is a layer serial number of the feature extraction network M(1);

a first data processing submodule, configured to process input data A(j) of a $j^{th}$ training task R(j) in a training task queue by using M(j), to obtain an output data set $\{C_l(j)\}$ of each layer of M(j);

a back propagation (BP) gradient flow calculating submodule, configured to calculate, based on the output data set $\{C_l(j)\}$ of each layer of M(j), a gradient flow $\Delta W_l(i, j)$ of neuron weights $W_l(i-1, j)$ of each layer of M(j) on an $i^{th}$ batch of data in the input data A(j) of the $j^{th}$ training task R(j) by using an error back propagation algorithm;

a filter, configured to filter the gradient flow $\Delta W_l(i, j)$ by using a filter parameter $\{P_l(j)\}$ for each layer of M(j), to obtain a filtered gradient flow $\Delta \hat{W}_l(i, j) = P_l(j)\Delta W_l(i, j)$;

a weight updating submodule, configured to update the neuron weights $W_l(i-1, j)$ of each layer of the feature extraction network M(j) based on the filtered gradient flow $\Delta \hat{W}_l(i, j)$ and a preset learning rate function $\lambda(i, j)$, to obtain updated weights $W_l(i, j)$;

a second data processing submodule, configured to process the input data A(j) of the $j^{th}$ training task R(j) in the training task queue by using M(j+1) with the updated weights $W_l(i, j)$, to obtain an updated output data set $\{C'_l(j)\}$ of each layer of M(j+1);

a filter parameter updating submodule, configured to update the filter parameter based on the updated output data set $\{C'_l(j)\}$, to obtain an updated filter parameter $\{P_l(j+1)\}$; and a model training loop control submodule, configured to set j=j+1, and iteratively update filter parameters and weights of the feature extraction network until training tasks in the training task queue are completed, to obtain an optimized feature extraction network corresponding to current input information.

4. The feature extraction system according to claim 3, wherein the model initializing submodule initializes the feature extraction network M(1) and acquire the initial filter parameter $\{P_l(1)\}$ for each layer of the feature extraction network M(1) according to the following formula:

$$P_l(1) = \beta I_l$$

wherein, $I_l$ is an identity matrix, and $\beta$ is a preset hyper-parameter.

5. The feature extraction system according to claim 3, wherein the weight updating submodule updates the neuron weights $W_l(i-1, j)$ of each layer of the feature extraction network M(j) based on the filtered gradient flow $\Delta \hat{W}_l(i, j)$ and the preset learning rate function $\lambda(i, j)$ according to the following formula:

$$W_l(i,j) = W_l(i-1,j) + \lambda(i,j)\Delta \hat{W}_l(i,j)$$

wherein, $W_l(i, j)$ is an updated weight matrix, $W_l(i-1, j)$ is a weight matrix before update, $\Delta \hat{W}_l(i, j)$ is an update increment, $\lambda(i, j)$ is the learning rate function, and $P_l(j-1)$ is orthogonal to a training task space of first to $(j-1)^{th}$ training task.

6. The feature extraction system according to claim 3, wherein the filter parameter updating submodule updates the filter parameter based on the updated output data set $\{C'_l(j)\}$ to obtain the updated filter parameter $\{P_l(j+1)\}$ according to the following formulas:

$$P_l(i,j) = P_l(i-1,j) - k_l \bar{x}_{l-1}(i,j)^T P_l(i-1,j)$$

$$k_l(i,j) = P_l(i-1,j)\bar{x}_{l-1}(i,j)/[\alpha_l(i) + \bar{x}_{l-1}(i,j)^T P_l(i-1,j)\bar{x}_{l-1}(i,j)]$$

$$P_l(0,j) = P_l(j)$$

$$P_l(j+1) = P_l(n_j, j)$$

wherein, j represents that j tasks are already completed; $n_j$ represents a batch number of feed-forward training data in the $j^{th}$ training task; $\bar{x}_{l-1}(i, j)$ represents an output result from neurons in a $(l-1)^{th}$ layer for the $i^{th}$ batch of data in the $j^{th}$ training task; $P_l(j)$ is a filter parameter corresponding to a $l^{th}$ layer of $M_l(j)$ in the $j^{th}$ training task; $\alpha_l(i)$ is a preset filter parameter updating speed rule, and T represents matrix transposition.

7. The feature extraction system according to claim 6, wherein the preset filter parameter updating speed rule $\alpha_l(i)$ is calculated according to the following formula:

$$\alpha_l(i) = \alpha_l(0)\gamma^{\sigma i/n_j}$$

wherein, $\gamma$, $\alpha_l(0)$, and $\sigma$ are preset hyper-parameters.

8. A feature extraction method based on neural network optimization by gradient filtering by using the feature extraction system according to claim 1, comprising:

step S10: constructing different feature extraction networks configured to extract input information features for different input information, comprising: constructing a ResNet neural network as a feature extraction network for the picture information, constructing a CNN/LSTM/GRU as a feature extraction network for the voice information, and constructing a fastText/TextCNN/TextRNN neural network as a feature extraction network for the text information;

step S20: for any one of the feature extraction networks for different input information, initializing a feature extraction network M(1) and acquiring an initial filter parameter $\{P_l(1)\}$ for each layer of the feature extraction network M(1), wherein l is a layer serial number of the feature extraction network M(1);

step S30: processing input data A(j) of a $j^{th}$ training task R(j) in a training task queue by using M(j), to obtain an output data set $\{C_l(j)\}$ of each layer of M(j);

step S40: calculating, based on the output data set $\{C_l(j)\}$ of each layer of M(j), a gradient flow $\Delta W_l(i, j)$ of neuron weights $W_l(i-1, j)$ of each layer of M(j) on an $i^{th}$ batch of data in the input data A(j) of the $j^{th}$ training task R(j) by using an error back propagation algorithm;

step S50: filtering the gradient flow $\Delta W_l(i, j)$ by using a filter parameter $\{P_l(j)\}$ for each layer of M(j), to obtain a filtered gradient flow $\Delta \hat{W}_l(i, j) = (j)\Delta W_l(i, j)$;

step S60: updating the neuron weights $W_l(i-1, j)$ of each layer of the feature extraction network M(j) based on the filtered gradient flow $\Delta \hat{W}_l(i, j)$ and a preset learning rate function $\lambda(i, j)$, to obtain updated weights $W_l(i, j)$;

step S70: processing the input data A(j) of the $j^{th}$ training task R(j) in the training task queue by using M(j+1) with the updated weights $W_l(i, j)$, to obtain an updated output data set $\{C'_l(j)\}$ of each layer of M(j+1);

step S80: updating the filter parameter based on the updated output data set $\{C'_l(j)\}$, to obtain an updated filter parameter $\{P_l(j+1)\}$;

step S90: setting j=j+1, and performing step S30 to step S80 repeatedly until training tasks in the training task queue are completed, to obtain an optimized feature extraction network corresponding to current input information;

step Sa0: optimizing the feature extraction networks for different input information by a method comprising step S20 to step S90, to obtain the optimized feature extraction networks for different input information; and step Sb0: calling a corresponding optimized feature extraction network according to a class of input information, and performing feature extraction to obtain a feature of the input information.

9. A continuous recognition method for handwritten Chinese characters based on artificial neural network optimization, comprising:
   step B10, using a multilayer perceptron as an artificial neural network $M_j$ for continual learning, and optimizing the artificial neural network $M_j$ by using an artificial neural network optimization method corresponding to step S20 to step S90 in the feature extraction method according to claim 8; and
   step B20, extracting features of a handwritten Chinese character picture through a residual network, and continuously recognizing the handwritten Chinese characters based on the features of the handwritten Chinese character picture through an optimized artificial neural network to obtain a continuous recognition result for the handwritten Chinese characters.

10. A processing apparatus, comprising:
    a processor, configured to execute each program; and
    a storage apparatus, configured to store a plurality of programs;
    wherein the plurality of programs are loaded and executed by the processor to implement the feature extraction method according to claim 8.

11. The feature extraction method according to claim 8, wherein the feature extraction device comprises:
    a model constructing module, configured to construct the feature extraction networks for different input information, comprising: constructing a ResNet neural network as a feature extraction network for the picture information, constructing a Convolutional Neural Network (CNN)/Long Short-Term Memory (LSTM)/Gated Recurrent Unit (GRU) as a feature extraction network for the voice information, and constructing a fastText/TextCNN/Text-Recurrent Neural Network (TextRNN) as a feature extraction network for the text information;
    a model optimizing module, configured to: for the feature extraction networks for different input information, iteratively update the gradient filter parameters of the feature extraction networks separately in combination with the corresponding training task queues to obtain the optimized feature extraction networks for different input information;
    a model storing module, configured to store the optimized feature extraction networks for different input information; and
    a model calling module, configured to call a corresponding optimized feature extraction network according to a class of input information acquired by an information acquisition end, and perform feature extraction to obtain a feature of the input information.

12. The feature extraction method according to claim 11, wherein the model optimizing module comprises:
    a model initializing submodule, configured to initialize the feature extraction network $M(1)$ and acquire the initial filter parameter $\{P_l(1)\}$ for each layer of the feature extraction network $M(1)$, wherein l is the layer serial number of the feature extraction network $M(1)$;
    a first data processing submodule, configured to process the input data $A(j)$ of the $j^{th}$ training task $R(j)$ in the training task queue by using $M(j)$, to obtain the output data set $\{C_l(j)\}$ of each layer of $M(j)$;
    a back propagation (BP) gradient flow calculating submodule, configured to calculate, based on the output data set $\{C_l(j)\}$ of each layer of $M(j)$, the gradient flow $\Delta W_l(i, j)$ of the neuron weights $W_l(i-1, j)$ of each layer of $M(j)$ on the $i^{th}$ batch of data in the input data $A(j)$ of the $j^{th}$ training task $R(j)$ by using the error back propagation algorithm;
    a filter, configured to filter the gradient flow $\Delta W_l(i, j)$ by using the filter parameter $\{P_l(j)\}$ for each layer of $M(j)$, to obtain the filtered gradient flow $\Delta\hat{W}_l(i, j)=P_l(j)\Delta W_l(i, j)$;
    a weight updating submodule, configured to update the neuron weights $W_l(i-1, j)$ of each layer of the feature extraction network $M(j)$ based on the filtered gradient flow $\Delta\hat{W}_l(i, j)$ and the preset learning rate function $\lambda(i, j)$, to obtain updated weights $W_l(i, j)$;
    a second data processing submodule, configured to process the input data $A(j)$ of the $j^{th}$ training task $R(j)$ in the training task queue by using the $M(j+1)$ with the updated weights $W_l(i, j)$, to obtain the updated output data set $\{C'_l(j)\}$ of each layer of $M(j+1)$;
    a filter parameter updating submodule, configured to update the filter parameter based on the updated output data set $\{C'_l(j)\}$, to obtain the updated filter parameter $\{P_l(j+1)\}$; and
    a model training loop control submodule, configured to set $j=j+1$, and iteratively update the filter parameters and the weights of the feature extraction network until the training tasks in the training task queue are completed, to obtain the optimized feature extraction network corresponding to the current input information.

13. The feature extraction method according to claim 12, wherein the model initializing submodule initializes the feature extraction network $M(1)$ and acquire the initial filter parameter $\{P_l(1)\}$ for each layer of the feature extraction network $M(1)$ according to the following formula:

$$P_l(1)=\beta I_l$$

wherein, $I_l$ is an identity matrix, and $\beta$ is a preset hyperparameter.

14. The feature extraction method according to claim 12, wherein the weight updating submodule updates the neuron weights $W_l(i-1, j)$ of each layer of the feature extraction network $M(j)$ based on the filtered gradient flow $\Delta\hat{W}_l(i, j)$ and the preset learning rate function $\lambda(i, j)$ according to the following formula:

$$W_l(i,j)=W_l(i-1,j)+\lambda(i,j)\Delta\hat{W}_l(i,j)$$

wherein, $W_l(i, j)$ is an updated weight matrix, $W_l(i-1, j)$ is a weight matrix before update, $\Delta\hat{W}_l(i, j)$ is an update increment, $\Delta(i, j)$ is the learning rate function, and $P_l(j-1)$ is orthogonal to a training task space of first to $(j-1)^{th}$ training task.

15. The feature extraction method according to claim 12, wherein the filter parameter updating submodule updates the filter parameter based on the updated output data set $\{C'_l(j)\}$ to obtain the updated filter parameter $\{P_l(j+1)\}$ according to the following formulas:

$$P_l(i,j)=P_l(i-1,j)-k_l\bar{x}_{l-1}(i,j)^T P_l(i-1,j)$$

$$k_l(i,j)=P_l(i-1,j)\bar{x}_{l-1}(i,j)/[\alpha_l(i)+\bar{x}_{l-1}(i,j)^T P_l(i-1,j)\bar{x}_{l-1}(i,j)]$$

$$P_l(0,j)=P_l(j)$$

$$P_l(j+1)=P_l(n_j,j)$$

wherein, j represents that j tasks are already completed; $n_j$ represents a batch number of feed-forward training data in the $j^{th}$ training task; $\bar{x}_{l-1}(i, j)$ represents an output result from neurons in a $(l-1)^{th}$ layer for the $i^{th}$ batch of data in the $j^{th}$ training task; $P_l(j)$ is a filter parameter corresponding to a $l^{th}$ layer of $M_l(j)$ in the $j^{th}$ training task; $\alpha_l(i)$ is a preset filter parameter updating speed rule, and T represents matrix transposition.

16. The feature extraction method according to claim 15, wherein the preset filter parameter updating speed rule $\alpha_l(i)$ is calculated according to the following formula:

$$\alpha_l(i)=\alpha_l(0)\gamma^{\sigma i/n_j}$$

wherein, $\gamma$, $\alpha_l(0)$, and $\sigma$ are preset hyper-parameters.

17. A processing apparatus, comprising:
a processor, configured to execute each program; and
a storage apparatus, configured to store a plurality of programs;
wherein the plurality of programs are loaded and executed by the processor to implement the continuous recognition method according to claim 9.

* * * * *